United States Patent

Tanaka et al.

[11] Patent Number: 5,849,659
[45] Date of Patent: Dec. 15, 1998

[54] EXHAUST GAS PURIFYING CATALYST

[75] Inventors: Hirohisa Tanaka, Gamo-gun; Kimiyoshi Kaneko, Atsugi, both of Japan

[73] Assignees: Daihatsu Motor Co., Ltd., Osaka; Hokko Chemical Industry Co., Ltd., Tokyo, both of Japan

[21] Appl. No.: 804,153

[22] Filed: Feb. 20, 1997

[30] Foreign Application Priority Data

Apr. 5, 1996 [JP] Japan ................................ 8-083907

[51] Int. Cl.$^6$ ............................... B01J 23/32; B01J 23/10
[52] U.S. Cl. ................. 502/324; 502/302; 502/303; 502/304; 502/306; 502/313; 502/323
[58] Field of Search ..................... 502/302, 303, 502/304, 306, 313, 323, 324, 325, 326, 327, 328, 332, 333, 334, 339, 340, 341, 355, 515, 517, 518, 524, 525

[56] References Cited

U.S. PATENT DOCUMENTS

| | | | |
|---|---|---|---|
| 3,900,428 | 8/1975 | Mai et al. ............................ | 502/302 |
| 4,049,583 | 9/1977 | Lauder .................................. | 423/593 |
| 4,127,510 | 11/1978 | Harrison et al. .................... | 423/600 |
| 5,338,715 | 8/1994 | Iida et al. ............................ | 502/64 |
| 5,380,692 | 1/1995 | Nakatsuji et al. .................. | 502/303 |
| 5,559,073 | 9/1996 | Hu et al. .............................. | 502/302 |
| 5,622,680 | 4/1997 | Monceaux et al. .................. | 502/303 |

*Primary Examiner*—Elizabeth D. Wood
*Attorney, Agent, or Firm*—Kubovcik & Kubovcik

[57] ABSTRACT

An exhaust gas purifying catalyst capable of exhibiting excellent catalytic purifying activity in long term use under high temperatures exceeding 900° C., the exhaust gas purifying catalyst comprising a heat-resistant oxide which is expressed by the following general formula:

$$AMn_xAl_{12-x}O_{19}$$

(where A represents an alkaline earth metal which can be substituted by an alkali metal and/or a rare earth element, and x represents an atomic ratio of 0.5 to 4) and a noble metal.

8 Claims, No Drawings

EXHAUST GAS PURIFYING CATALYST

BACKGROUND OF THE INVENTION

1. Field of the Invention

The present invention relates to a catalyst for efficiently purifying exhaust gases containing carbon monoxide (CO), hydrocarbon (HC) species and nitrogen oxide (NOx) contained in automotive emissions and the like.

2. Description of the Related Art

On catalysts for purifying automotive emissions, development of three-way catalysts which can simultaneously clean up carbon monoxide (CO), hydrocarbon (HC) species and nitrogen oxide (NOx) contained in automotive emissions have been proceeding. Among the three-way catalysts, those which contain a noble metal, such as platinum, palladium or rhodium, as an active material are well known.

In general, those three-way catalysts employ alumina, especially the $\gamma$-$Al_2O_3$, as a composition of a carrier of catalyst, and the noble metal described above is dispersed and supported on the $\gamma$-$Al_2O_3$.

The $\gamma$-$Al_2O_3$ is however suceptible to sintering and structural phase transition with increased temperature, so that, in long term use at a high temperature exceeding 900° C. which is a required temperature for an exhaust gas purifying catalyst, the $\gamma$-$Al_2O_3$ is deteriorated by heat and cannot fully exert the function as a catalyst carrier.

With automotive emission control being strengthened at home and abroad, development of an exhaust gas purifying catalyst which can exhibit catalytic purifying activity from immediately after starting a motor even in cold weather has been desired. Full exertion of the catalytic purifying activity requires that the temperature of the catalyst be raised as quickly as possible to a specific point at which catalytic purifying activity can be exerted from immediately after starting a motor. For this, the exhaust gas purifying catalyst must be placed near the motor, but the catalyst, when placed near the motor, is subjected to extremely high temperature during operation of the motor, so that it is hard for the exhaust gas purifying catalyst employing the $\gamma$-$Al_2O_3$ as a carrier of catalyst to maintain its catalytic activity in long term use.

Various improvements in heat resisting property of the $\gamma$-$Al_2O_3$ as a carrier of catalyst have been proposed, e.g., addition of a heat-stable improver to the $\gamma$-$Al_2O_3$ carrier, or conversely, avoidance of addition of any material which may reduce stability of the $\gamma$-$Al_2O_3$ thereto. However, no proposals have yet succeeded in providing a catalyst which can maintain catalytic purifying activity at such extremely high temperatures as described above in long term use.

SUMMARY OF THE INVENTION

The object of the invention is to provide an exhaust gas purifying catalyst which exhibits excellent catalytic purifying activity in long term use under high temperatures.

The present invention is directed to an exhaust gas purifying catalyst comprising a heat-resistant oxide which is expressed in the following general formula:

$$AMn_xAl_{12-x}O_{19}$$

(where A represents an alkaline earth metal which may be substituted by an alkali metal and/or rare earth element, and x represents an atomic ratio of 0.5 to 4) and a noble metal.

DETAILED DESCRIPTION OF THE PREFERRED EMBODIMENT

In the exhaust gas purifying catalyst of the invention, a heat-resistant oxide, which is expressed in the following general formula:

$$AMn_xAl_{12-x}O_{19}$$

(where A represents an alkaline earth metal which may be substituted by an alkali metal and/or a rare earth element, and x represents an atomic ratio of 0.5 to 4), has a composition of Mn substituted hexaaluminate $(A(Mn_xAl_{12-x})O_{19})$ based on a composition of hexaaluminate $(AO.6Al_2O_3)$ consisting of A of oxide (AO) and 6 moleculars of alumina $(6Al_2O_3)$, and A is selected from alkaline earth metals which may be substituted by an alkali metal and/or an rare earth element.

The alkaline earth metal employed may be selected from beryllium (Be), magnesium (Mg), calcium (Ca), strontium (Sr), barium (Ba) and radium (Ra). It is industrially preferable to employ magnesium (Mg), calcium (Ca), strontium (Sr), and barium (Ba). The alkaline earth metal may be employed alone or in combination of two or more.

A part of the alkaline earth metal may be substituted by an alkali metal and/or a rare earth element.

Such a substitutive alkali metal may be selected from lithium (Li), natrium (Na), potassium (K), rubidium (Rb), cesium (Cs), and francium (Fr). It is industrially preferable to employ potassium (K). The alkaline earth metal may be substituted for a single alkali metal or two or more alkali metals.

Also, such a substitutive rare earth element may be selected from yttrium (Y), scandium (Sc), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb) and lutetium (Lu). It is industrially preferable to employ yttrium (Y) and Lanthanum (La). The alkaline earth metal may be substituted for a single rare earth element or two or more rare earth elements.

The atomic ratio of manganese (Mn) represented by x is in the range of 0.5 to 4. This is because if the atomic ratio x is less than 0.5, the catalyst is maintained high in heat-resistance but is deteriorated in catalytic purifying activity, and on the other hand, if the atomic ratio x is more than 4, two mixed phases of hexaaluminate and manganese oxide are formed a result in deterioration in heat resistance.

The noble metal for implanting catalytic purifying activity to the catalyst may be selected from the platinum group elements consisting of ruthenium (Ru), rhodium (Rh), palladium (Pd), osmium (Os), iridium (Ir) and platinum (Pt). It is industrially preferable to employ platinum (Pt), rhodium (Rh), and palladium (Pd). The noble metal employed is preferably contained in the exhaust gas purifying catalyst in a ratio of 0.01 to 10 parts by weight, preferably 0.05 to 2 parts by weight, to 100 parts by weight of the heat-resistant oxide.

The exhaust gas purifying catalyst of the invention may be produced by any known method, e.g., by a method by which a heat-resistant oxide is produced in advance, and then a noble metal is supported on the heat-resistant oxide.

Also, the heat-resistant oxide can be produced by, for example, an alkoxide method, a salt decomposition method, a citric acid complexing method and a coprecipitation method.

To take the alkoxide method as an example at first, a mixed alkoxide solution is prepared first by mixing alcoholate of an alkaline earth metal, manganese, aluminum and, if necessary, an alkali metal and/or rare metal element, in a commercially available organic solvent such as toluene or xylene in a prescribed stoichiometric ratio. Then, the mixed alkoxide solution is coprecipitated or hydrolyzed by adding water thereto, and thereafter the coprecipitated substance or hydrolyzed product, after dried, is heat-treated, whereby the heat-resistant oxide is obtained.

In this alkoxide method, alkoxide of the mixed alkoxide solution may be selected from alkoxyalcoholate such as methoxide, ethoxide, propoxide, butoxide, or an ethoxyethylate or methoxypropylate thereof.

Also, as far as specific constituents in the constituents of alkaline earth metal, manganese, aluminum, alkali metal, and rare earth element are concerned, no alcoholate is employed. In this case, after a mixed alkoxide solution is first prepared from other constituents than the specific constituents, the mixed alcoholate solution may be coprecipitated or hydrolyzed by adding aqueous solution containing a salt of the specific constituents to the mixed alcoholate solution. Nitrate is preferably employed as such a salt. For instance, after a mixed alkoxide solution is prepared, an aqueous solution containing nitrate such as potassium nitrate, or manganese nitrate may be added to the mixed alkoxide solution, to coprecipitate or hydrolyze the mixed alkoxide solution.

Further, the heat treatment of the produced coprecipitate or hydrolyzate is performed in the following steps: The coprecipitated substance or hydrolyzed product is dried at about 30° to 120° C. for about 1 to 48 hours for obtaining a dry substance, and thereafter the produced substance is fired at about 500° to 1300° C., preferably at 800° to 1100° C., for 0.5 to 12 hours, preferably for about 1 to 4 hours. If the coprecipitated substance or hydrolyzed product contains a salt, then the product is preferably filtered to obtain a hydrate, which is then fully washed with water.

Preferably, the firing is so performed that at least a part of the heat-resistant oxide can form a crystal phase such as a magnetoplumbite phase or a spinel phase to improve the heat resistance of the heat-resistant oxide. Preferred firing conditions for forming such a crystal phase can be properly determined according to the compositions and the ratio of the compositions of the heat-resistant oxide.

Turning to the salt decomposition method, salts of a composition of alkaline earth metals, manganese, aluminum and, if necessary, an alkali metal and/or rare earth element are mixed in water in a prescribed stoichiometric ratio. Then, the mixture is evaporated to dryness with water distilled away therefrom under reduced pressure, and thereafter is subjected to the above-described heat treatment, whereby the heat-resistant oxide is obtained.

Salts employed in this method may be selected from inorganic salts such as sulfate, nitrate, hydrochloride, phosphate, and organic salts such as acetate and oxalate. Preferably, nitrate and acetate are employed.

Turning further to the citric acid complexing method, a mixed aqueous solution is prepared by mixing salts of composition of alkaline earth metals, manganese, aluminum and, if necessary, alkali metals and/or rare earth element in water in a prescribed stoichiometric ratio. Then, an aqueous solution containing citric acid is added to the mixed aqueous solution to precipitate the composition as citric acid complexes. Then, the mixture is evaporated to dryness with water distilled away therefrom under educed pressure, and thereafter is subjected to the above-described heat treatment, whereby the heat-resistant oxide is produced. The salts employed in this method are the same as those in the salt decomposition method.

Turning still further to the coprecipitation method, a mixed aqueous solution is prepared by mixing chlorides of composition of alkaline earth metals, manganese, aluminum and, if necessary, alkali metals and/or rare earth element in water in a prescribed stoichiometric ratio. Then, an alkaline aqueous solution is added to the mixed aqueous solution to coprecipitate the composition. The coprecipitate, after filtered off and washed with water, is subjected to the above-described heat treatment, whereby the heat resistant oxide is produced. A preferable example of an alkaline aqueous solution employed in this method is aqueous ammonia.

As an example of how a noble metal is supported on this produced heat-resistant oxide is: after a salt solution containing noble metal is prepared, the salt solution is impregnated into the heat-resistant oxide and thereafter the heat-resistant oxide is fired.

The salt solution employed in this case can be selected from any known solution containing salt. Practically, an aqueous nitrate solution, a dinitrodiammine nitrate solution, or an aqueous chloride solution are employed. Specifically, a dinitrodiammine platinum nitrate solution, a platinum chloride solution or a tetravalent platinum ammine solution is preferably employed as a platinum salt solution; an aqueous palladium nitrate solution, a dinitrodiammine palladium nitrate solution, or a tetravalent palladium ammine nitrate solution is preferably employed as a palladium salt solution; and a rhodium nitrate solution or a rhodium chloride solution is preferably employed as a rhodium salt solution. Preferably, the salt solution contains about 1 to 20 percent salt by weight.

After the salt solution containing noble metal is impregnated into the heat-resistant oxide, the heat-resistant oxide is dried preferably at about 50° to 200° C. for about 1 to 48 hours and further is fired at about 350° to 1000° C. for 1 to 12 hours, whereby the noble metal is supported on the heat-resistant oxide.

Further, another method may be used for producing the exhaust gas purifying catalyst of the invention. In the another method, at the producing process of the above-described heat-resistant oxide, at which a mixed alkoxide solution or a salt solution containing a composition of an alkaline earth metal, manganese, aluminum and, if necessary, alkali metals and/or rare earth element is coprecipitated or hydrolyzed, a solution of a noble metal salt is added so that the noble metal salt can be coprecipitated with the composition of the heat-resistant oxide and thereafter the coprecipitated product is subjected to the heat treatment. In this method also, the above-mentioned salt solution is employed.

The exhaust gas purifying catalyst of the invention produced by any one of those methods is supported, for example, on a honeycomb carrier consisting of cordierite, to be practically used as a monolithic catalyst.

To take an example of the methods for supporting the heat-resistant oxide on a honeycomb carrier, the heat-resistant oxide is slurried by adding water thereto, and thereafter an alumina sol of 20–80 parts by weight per 100 parts by weight of the heat-resistant oxide is mixed into the slurry. The honeycomb carrier is coated with the resulting mixture, and thereafter is dried at preferably 50° to 200° C. for about 1 to 48 hours and further fired at about 350° to 1000° C. for about 1 to 12 hours, thereby allowing the heat-resistant oxide to be first supported on the honeycomb carrier. Then, the honeycomb carrier is impregnated with a salt solution containing a noble metal to absorb the noble metal, thereby supporting the noble metal on the honeycomb carrier.

Further, the exhaust gas purifying catalyst of the invention may contain a cerium-containing oxide. The catalyst containing the cerium-containing oxide, cerium oxide ($CeO_2$), can exert the function of occluding or liberating oxygen in a gas phase (oxygen storage capability) to adjust a gas phase atmosphere in an oxidative reaction of CO and HC and a reduction reaction of NOx, thus providing improved purifying efficiency of the catalyst.

The cerium-containing oxide is selected from a cerium oxide ($CeO_2$); a complexed oxide (complexed oxide of $CeO_2$—$ZrO_2$ series) produced by adding zirconium (Zr) to a cerium oxide to improve heat resistance; and another complexed oxide (complexed oxide of $CeO_2$—$ZrO_2$—$Y_2O_3$ series, complexed oxide of $CeO_2$—$ZrO_2$—$La_2O_3$ series, or equivalent) produced by further adding a rare earth element, such as yttrium (Y), lanthanum (La) or the like, to the complexed oxide of $CeO_2$—$ZrO_2$ series.

The complexed oxide containing cerium can be produced by known methods. For example, (i) cerium oxide powder is slurried by adding water thereto, and then the slurry is fully stirred with an aqueous solution, in which a zirconium salt and rare earth metal salt are mixed in a prescribed stoichiometric ratio, added to the slurry and then is subjected to heat treatment, (ii) a salt solution containing cerium, zirconium, and rare earth metal mixed in a prescribed stoichiometric ratio is prepared; then the salt containing cerium, zirconium, and rare earth metals is coprecipitated by adding an alkaline aqueous solution to the salt solution; and then the coprecipitated substance is subjected to heat treatment, or (iii) a complexed alkoxide solution containing cerium, zirconium and rare earth metal is prepared, then the mixed alkoxide solution is coprecipitated or hydrolyzed by adding deionized water to the same, and then the coprecipitated substance or the hydrolyzed product is subjected to heat treatment.

The zirconium salt and rare earth metal salt employed may be selected from inorganic salts such as sulfates, nitrates, hydrochlorides and phosphates, and organic salts such as acetates and oxalates. Preferably, nitrates are employed for the zirconium salt and rare earth metal salt. Further, the alkoxide of the mixed alkoxide solution employed may be selected from methoxide, ethoxide, propoxide, butoxide of cerium, zirconium and rare earth metals or an alkoxyalcoholate thereof.

The heat treatment of the coprecipitated substance, or the hydrolyzed product is performed in the following steps: first, the coprecipitated substance, or the hydrolyzed product is dried under reduced pressure with a vacuum drier or the like, and thereafter is further dried at about 50° to 200° C. for about 1 to 48 hours to obtain a dry substance. Then, the dry substance is fired at about 350° to 1000° C., preferably at about 400° to 700° C., for about 1 to 12 hours, preferably for about 2 to 4 hours.

The resulting cerium-containing oxide is mixed with the heat-resistant oxide, which is slurried by adding water thereto, in a proportion of 20–80 parts by weight per 100 parts by weight of the heat-resistant oxide and then is dried, thereby allowing the resulting heat-resistant oxide to be contained in the exhaust gas purifying catalyst of the invention. Specifically, for example, in the case where the heat-resistant oxide is supported on a honeycomb carrier of cordierite or equivalent, to be used as a monolithic catalyst, the heat-resistant oxide is slurried by adding water thereto, and thereafter the cerium-containing oxide of 20–80 parts by weight per 100 parts by weight of the heat-resistant oxide and the alumina sol of 20–80 parts by weight per 100 parts by weight of the heat-resistant oxide are mixed into the slurry. The honeycomb carrier is coated with the resulting mixture and thereafter is dried at preferably 50° to 200° C. for about 1 to 48 hours and further fired at about 350° to 1000° C. for about 1 to 12 hours, thereby allowing the heat-resistant oxide to be supported on the honeycomb carrier. Then, the honeycomb carrier is impregnated with a salt solution containing a noble metal to absorb the noble metal, thereby supporting the noble metal on the honeycomb carrier.

The resulting exhaust gas purifying catalyst of the invention exhibits excellent catalytic activity, without heat deterioration, in long term use under high temperatures exceeding 900° C. which is a required temperature for an exhaust gas purifying catalyst. This can provide the result, in particular, that even if the catalyst is placed near a motor which increases in temperature to an extremely high temperature, the catalytic purifying activity of the catalyst can be maintained over the long term.

EXAMPLES

The invention will be more clearly understood with reference to the following examples:

Example 1

1-1. Production of the heat-resistant oxide A:

5.1 g (0.020 moles) of barium isopropoxide, and 44.9 g (0.220 moles) of aluminum isopropoxide, which were poured into a round-bottomed flask of 500 ml, were stirred and dissolved with addition of 200 ml of toluene, whereby a mixed alkoxide solution was prepared. Separately from the mixed alkoxide solution, an aqueous solution in which 5.7 g (0.02 moles) of manganese nitrate hexahydrate was dissolved in 80 ml of water, was prepared and then the aqueous solution was dropped into the mixed alkoxide solution to thereby form a slurry. Then, water and solvent were distilled away from the formed slurry to dryness under reduced pressure, whereby a $BaMnAl_{11}O_{19}$ precursor gel was produced. Then, the precursor gel, after being transferred into a petri dish, was dried with ventilation at 60° C. for 24 hours and thereafter was heat-treated at 1000° C. for 1 hour, whereby a blackish brown, powdery, heat-resistant oxide A was produced. The powder of the produced heat resistant oxide A was amorphous having a composition of a $BaMnAl_{11}O_{19}$ and was 92 $m^2/g$ in specific surface area (BET method, the same method is used also in the following examples). When the powder was heat-treated at 1300° C. for 1 hour, the powder turned into a single phase of magnetoplumbite of 15 $m^2/g$ in specific surface area.

1-2. Production of the exhaust gas purifying catalyst 1:

The powder of the produced heat-resistant oxide A was slurried by adding deionized water thereto, and further 50 g of alumina sol (alumina sol-200, made by Nissan Kagaku Kogyo K.K., 5 g in solid, the same is used also in the following examples) per 100 g of the powder of the heat-resistant oxide A were mixed into the slurry and fully stirred. Then, a cordierite carrier (30 mm in diameter, 50 mm in length) in the form of a honeycomb (400/$inch^2$ in the number of cells) was coated with the resulting slurry. This coated cordierite carrier, after being dried, was fired in an electric furnace at 600° C. for 3 hours under atmospheric pressure.

Then, after a dinitrodiammine platinum nitrate solution (made by Tanaka Kikinzoku Kogyo K.K., and having a 4.569 percent platinum content by weight) and a rhodium nitrate solution (made by Tanaka Kikinzoku Kogyo K.K., and having a 4.478 percent rhodium content by weight) were diluted with deionized water, the diluted solutions were impregnated into the honeycomb carrier which had been coated with the heat-resistant oxide A, to support the platinum and rhodium on the honeycomb carrier, whereby the exhaust gas purifying catalyst 1 was produced.

The contents of the components (heat-resistant oxide, noble metals) per one liter of the honeycomb carrier capacity are shown in Table 1 (expressed in g/lcat).

1-3. Evaluation of the exhaust gas purifying catalyst 1:

With the produced exhaust gas purifying catalyst 1 fit in an exhaust pipe of four cylinders on one side of a 4-liter, V-type, eight-cylinder engine, the engine was operated by use of an engine bench at a theoretical air fuel ratio A/F= 14.6±1.0 and a feedback constant of 0.6 Hz, for performing an endurance test of the catalyst 1 at 950° C. for 60 hours. And, the measurements were made on catalytic activity under low temperature and a purifying rate at a CO-NOx crossover point. The results are shown in Table 1.

1) Catalytic activity under low temperature (Temperature dependency)

The catalytic activity was measured through the following model gases. The gas temperature was expressed in an inlet gas temperature to the catalyst and the gas temperature which arose from room temperature and at which concentration of NO, CO, and HC($C_3H_6+C_3H_8$) were each reduced to 50% of their initial concentration was taken as a 50% purifying temperature ($T_{50}$(°C.)).

Also, a switch between a rich gas and a lean gas were done every 1 second and a space velocity (SV) at which the gas passed through the catalyst was taken as 70,000/hours.

|  | Rich Gas | Lean Gas |
| --- | --- | --- |
| CO | 2.6% | 0.7% |
| HC | 0.19% | 0.19% |
| ($C_1$ converted concentration) |  |  |
| $H_2$ | 0.87% | 0.23% |
| $CO_2$ | 8.0% | 8.0% |
| NO | 0.17% | 0.17% |
| $O_2$ | 0.65% | 1.8% |
| $H_2O$ | 10.0% | 10.0% |
| $N_2$ | Remainder | Remainder |

2) Purifying rate at a CO-NOx crossover point

While the rich gas and lean gas of following composition were switched with each other every 1 second, with the inlet gas temperature held at 400° C., the amount α of $O_2$ was increased gradually from 0% to 5%. And, the point at which a CO purifying rate and a NO purifying rate were equal to each other was defined as a purifying rate at a CO-NOx crossover point. The space velocity (SV) was taken as 70,000/hours.

|  | Rich Gas | Lean Gas |
| --- | --- | --- |
| CO | 2.6% | 0.7% |
| HC | 0.19% | 0.19% |
| ($C_1$ converted concentration) |  |  |
| $H_2$ | 0.87% | 0.23% |
| $CO_2$ | 8.0% | 8.0% |
| NO | 0.17% | 0.17% |
| $O_2$ | α % | α + 1.15% |
| $H_2O$ | 10.0% | 10.0% |
| $N_2$ | Remainder | Remains |

Example 2

2-1. Production of the heat-resistant oxide B:

5.3 g (0.020 moles) of strontium ethoxyethylate, and 4.7 g (0.020 moles) of manganese ethoxyethylate and 64.7 g (0.220 moles) of aluminum ethoxyethylate, which were poured into a round-bottomed flask of 500 ml, were stirred and dissolved with addition of 200 ml of toluene, whereby a mixed alkoxide solution was prepared. Then, 80 ml of water was dropped into the mixed alkoxide solution, spending about 10 minutes, to thereby form a slurry. Then, water and solvent were distilled away from the formed slurry to dryness under reduced pressure, whereby a $SrMnAl_{11}O_{19}$ precursor gel was produced. Then, the precursor gel, after being transferred into a petri dish, was dried with ventilation at 60° C. for 24 hours and thereafter was heat-treated at 1000° C. for 1 hour, whereby a blackish brown, powdery, heat-resistant oxide B was produced. The powder of the produced heat resistant oxide B was amorphous having a composition of $SrMnAl_{11}O_{19}$ and was 110 $m^2$/g in specific surface area. When the powder was heat-treated at 1300° C. for 1 hour, the powder turned into a single phase of magnetoplumbite of 10.8 $m^2$/g in specific surface area.

2-2. Production of the exhaust gas purifying catalyst 2:

A cordierite carrier in the form of a honeycomb was coated with the powder of the produced heat-resistant oxide B, then, the platinum and rhodium were supported on the honeycomb carrier which had been coated with the heat-resistant oxide B, in the same operations as in the Example 1, whereby the exhaust gas purifying catalyst 2 was produced.

2-3. Evaluation of the exhaust gas purifying catalyst 2:

An endurance test of the produced exhaust gas purifying catalyst 2 was performed at 950° C. for 60 hours by use of the engine bench, in the same manner as Example 1. Measurements were made on catalytic activity under low temperature and a purifying rate at a CO-NOx crossover point. The results are shown in Table 1.

Example 3

3-1. Production of the heat-resistant oxide C:

0.4 g (0.002 moles) of strontium nitrate, 3.4 g (0.008 moles) of lanthanum nitrate hexahydrate, 2.5 g (0.010 moles) of manganese nitrate tetrahydrate, and 41.3 g (0.110 moles) of aluminum nitrate enneahydrate, which were poured into a round-bottomed flask of 500 ml, were stirred and dissolved with addition of 200 ml of water, whereby a mixed nitrate solution was prepared. An aqueous solution in which 95.8 g (0.46 moles) of citrate monohydrate was dissolved in 100 ml of water, was separately prepared, and then was dropped into the mixed nitrate solution to be precipitated as a citrate complex. Then, water was distilled away to dryness under reduced pressure, whereby a $Sr_{0.2}La_{0.8}MnAl_{11}O_{19}$ precursor gel was produced. Then, the precursor gel, after being transferred into a petri dish, was dried with ventilation at 60° C. for 24 hours and thereafter was heat-treated at 1000° C. for 1 hour, whereby a blackish brown, powdery, heat-resistant oxide C was produced. The powder of the produced heat resistant oxide C was amorphous having a composition of $Sr_{0.2}La_{0.8}MnAl_{11}O_{19}$ and was 101 $m^2$/g in specific surface area. When the powder was heat-treated at 1300° C. for 1 hour, the powder turned into a single phase of magnetoplumbite of 16.3 $m^2$/g in specific surface area.

3-2. Production of the exhaust gas purifying catalyst 3:

A cordierite carrier in the form of a honeycomb was coated with the powder of the produced heat-resistant oxide C, and then the platinum and rhodium were supported on the honeycomb carrier which had been coated with the heat-resistant oxide C, in the same operations as in the Example 1, whereby the exhaust gas purifying catalyst 3 was produced.

3-3. Evaluation of the exhaust gas purifying catalyst 3:

An endurance test of the produced exhaust gas purifying catalyst 3 was performed at 950° C. for 60 hours by use of the engine bench, in the same manner as Example 1. Measurements were made on catalytic activity under low temperature and a purifying rate at a CO-NOx crossover point. The results are shown in Table 1.

Example 4

4.1 g (0.016 moles) of barium isopropoxide, and 44.9 g (0.220 moles) of aluminum isopropoxide, which were poured into a round-bottomed flask of 500 ml, were stirred and dissolved with addition of 200 ml of toluene, whereby a mixed alkoxide solution was prepared. Separately from the mixed alkoxide solution, an aqueous solution in which 5.7 g (0.02 moles) of manganese nitrate hexahydrate and 0.4 g (0.004 moles) potassium nitrate were dissolved in 80 ml of water, was prepared and then the aqueous solution was dropped into the mixed alkoxide solution to thereby form a slurry. Then, water and solvent were distilled away from the formed slurry to dryness under reduced pressure, whereby a $Ba_{0.8}K_{0.2}MnAl_{11}O_{19}$ precursor gel was produced. Then, the precursor gel, after being transferred into a petri dish, was dried with ventilation at 60° C. for 24 hours and thereafter was heat-treated at 1000° C. for 1 hour, whereby a blackish brown, powdery, heat-resistant oxide D was produced. The powder of the produced heat resistant oxide D was of amorphous having a composition of $Ba_{0.8}K_{0.2}MnAl_{11}O_{19}$ and was 121 $m^2/g$ in specific surface area. When the powder was heat-treated at 1300° C. for 1 hour, the powder turned into a single phase of magnetoplumbite of 23.2 $m^2/g$ in specific surface area.

4-2. Production of the cerium-containing heat-resistant oxide X:

48.0 g (0.111 moles) of cerium butoxide, 19.6 g (0.051 moles) of zirconium butoxide and 2.8 g (0.009 moles) of yttrium butoxide, which were poured into a round-bottomed flask of 500 ml, were stirred and dissolved with addition of 200 ml of toluene, whereby a mixed alkoxide solution was prepared. The mixed alkoxide solution was dropped into 600 ml of water fed in a one liter round-bottomed flask, spending about 10 minutes, to thereby form a milky precipitate. Then, the formed precipitate was heated to distill much of solvent away, whereby a $Ce_{0.65}Zr_{0.30}Y_{0.05}$Oxide precursor slurry dispersed substance was produced.

Then, 0.569 g of a dinitrodiammine platinum nitrate solution (platinum content: 4.569 percent by weight) was dissolved in 20 ml of water, and the $Ce_{0.65}Zr_{0.30}Y_{0.05}$Oxide precursor slurry dispersed substance was added to the resulting solution and stirred. Thereafter, water was distilled away under reduced pressure, whereby a milky viscous $Ce_{0.65}Zr_{0.30}Y_{0.05}$Oxide/Pt precursor was produced.

The $Ce_{0.65}Zr_{0.30}Y_{0.05}$Oxide/Pt precursor was dried with ventilation at 60° C. for 24 hours and thereafter was fired in an electric furnace at 450° C. for 3 hours, whereby a yellowish white, powdery, cerium-containing oxide X having a composition of $Ce_{0.65}Zr_{0.30}Y_{0.05}$Oxide/Pt was produced.

4-3. Production of the exhaust gas purifying catalyst 4:

After 100 g of the powder of the produced heat-resistant oxide D and 50 g of the powder of the cerium-containing oxide X were mixed, the mixture was slurried by adding deionized water thereto. Further, 75 g of alumina sol (7.5 g in solid) per 150 g of the mixed powder was mixed with the slurry and fully stirred. Then, a cordierite carrier (30 mm in diameter, 50 mm in length) in the form of the honeycomb (400/$inch^2$ in the number of cells) was coated with the resulting slurry. This coated cordierite carrier, after being dried, was fired in an electric furnace at 600° C. for 3 hours under atmospheric pressure.

Then, after a palladium nitrate solution (made by Tanaka Kikinzoku Kogyo K.K., and having a 4.400 percent palladium content by weight) was diluted with deionized water, the diluted solutions were impregnated into a honeycomb carrier which had been coated with the heat-resistant oxide D and the cerium-containing oxide X, to support the palladium on the honeycomb carrier, whereby the exhaust gas purifying catalyst 4 was produced.

The contents of the components (heat-resistant oxide, noble metals, and cerium-containing oxide) per one liter of the honeycomb carrier capacity are shown in Table 1 (expressed in g/lcat).

4-4. Evaluation of the exhaust gas purifying catalyst 4:

An endurance test of the produced exhaust gas purifying catalyst 4 was performed at 950° C. for 60 hours by use of the engine bench, in the same manner as Example 1. Measurements were made on the catalytic activity under low temperature and the purifying rate at a CO-NOx crossover point. The results are shown in Table 1.

Example 5

5-1. Production of Heat-resistant Oxide E:

Except that 4.3 g (0.016 moles) of strontium ethoxyethylate, 1.6 g (0.004 moles) of lanthanum ethoxyethylate, 4.7 g (0.020 moles) of manganese ethoxyethylate, and 64.7 g (0.220 moles) of aluminum ethoxyethylate were employed, the same operations as those in Example 2 were performed, so that a blackish brown, powdery, heat-resistant oxide E having a composition of $Sr_{0.8}La_{0.2}MnAl_{11}O_{19}$ was produced. The powder of the produced heat resistant oxide E was amorphous and was 104 $m^2/g$ in specific surface area. When the powder was heat-treated at 1300° C. for 1 hour, the powder turned into a single phase of magnetoplumbite of 13.5 $m^2/g$ in specific surface area.

5-2. Production of the exhaust gas purifying catalyst 5:

A cordierite carrier in the form of a honeycomb was coated with the powder of the produced heat-resistant oxide E, and then the palladium was supported on the honeycomb carrier which had been coated with the heat-resistant oxide E and the cerium-containing oxide X, in the same operations as in Example 4, whereby the exhaust gas purifying catalyst 5 was produced.

5-3. Evaluation of the exhaust gas purifying catalyst 5:

An endurance test of the produced exhaust gas purifying catalyst 5 was performed at 950° C. for 60 hours by use of the engine bench, in the same manner as Example 1. Measurements were made on the catalytic activity under low temperature and the purifying rate at a CO-NOx crossover point. The results are shown in Table 1.

Example 6

6-1. Production of Heat-resistant Oxide F 3.3 g (0.016 moles) of magnesium chloride hexahydrate, and 1.2 g (0.004 moles) of yttrium chloride hexahydrate, 4.0 g (0.020 moles) of manganese chloride tetrahydrate and 53.1 g (0.220 moles) of aluminum chloride hexahydrate, which were poured into a round-bottomed flask of 500 ml, were stirred and dissolved with addition of 200 ml of water, whereby a mixed salt aqueous solution was prepared. Separately from the mixed salt aqueous solution, an aqueous ammonia solution, in which 90.0 g (1.49 moles) of aqueous ammonia (a 28% aqueous solution) was dissolved in 100 ml of water, was prepared and then the aqueous ammonia solution was dropped into the mixed salt aqueous solution to thereby form a brown precipitate. Then, the formed brown precipitate, after filtered off and washed with water to eliminate salts, whereby a $Mg_{0.8}Y_{0.2}MnAl_{11}O_{19}$ precursor slurry was produced. Then, the precursor slurry, after being transferred into a petri dish, was dried with ventilation at 60° C. for 24 hours and thereafter was heat-treated at 1000° C. for 1 hour, whereby a blackish brown, powdery, heat-resistant oxide F was produced. The powder of the produced heat resistant oxide F was amorphous having a composition of $Mg_{0.8}Y_{0.2}MnAl_{11}O_{19}$ and was 150 m²/g in specific surface area. When the powder was heat-treated at 1300° C. for 1 hour, the powder turned into a crystal phase of a composition consisting mainly of $\alpha$-$Al_2O_3$ of 0.8 m²/g in specific surface area.

6-2. Production of the exhaust gas purifying catalyst 6:

A cordierite carrier in the form of a honeycomb was coated with the powder of the produced heat-resistant oxide F, and then the palladium was supported on the honeycomb carrier which had been coated with the heat-resistant oxide E and the cerium-containing oxide X, in the same operations as in Example 4, whereby the exhaust gas purifying catalyst 6 was produced.

6-3. Evaluation of the exhaust gas purifying catalyst 6:

An endurance test of the produced exhaust gas purifying catalyst 6 was performed at 950° C. for 60 hours by use of the engine bench, in the some manner as Example 1. Measurements were made on the catalytic activity under low temperature and the purifying rate at a CO-NOx crossover point. The results are shown in Table. 1.

Example 7

7-1. Production of Heat-resistant Oxide G 5.1 g (0.020 moles) of barium acetate, 2.5 g (0.010 moles) of manganese acetate tetrahydrate, and 86.3 g (0.230 moles) of aluminum nitrate enneahydrate, which were poured into a round-bottomed flask of 500 ml, were stirred and dissolved with addition of 300 ml of water. Then, the water was distilled away from the mixed solution to dryness under reduced pressure, whereby a $BaMn_{0.5}Al_{11.5}O_{19}$ precursor gel was produced. Then, the precursor gel, after being transferred into a petri dish, was dried with ventilation at 60° C. for 24 hours and thereafter was heat-treated at 1000° C. for 1 hour, whereby a blackish brown, powdery, heat-resistant oxide G was produced. The powder of the produced heat resistant oxide G was amorphous having a composition of $BaMn_{0.5}Al_{11.5}O_{19}$ and was 76.5 m²/g in specific surface area. When the powder was heat-treated at 1300° C. for 1 hour, the powder turned into a single phase of magnetoplumbite of 8.9 m²/g in specific surface area.

7-2. Production of the exhaust gas purifying catalyst 5:

After 100 g of the powder of the produced heat-resistant oxide G and 50 g of the powder of the cerium-containing oxide X, which was produced by same operations in Example 4, were mixed, the mixture was slurried with addition of deionized water. Further, 75 g of alumina sol (7.5 g in solid) per 150 g of the mixed powder was mixed into the slurry and fully stirred. Then, a cordierite carrier (30 mm in diameter, 50 mm in length) in the form of a honeycomb (400/inch² in the number of cells) was coated with the resulting slurry. And, this coated cordierite carrier, after being dried, was fired in an electric furnace at 600° C. for 3 hours under atmospheric pressure.

Then, after a dinitrodiammine platinum nitrate solution (made by Tanaka Kikinzoku Kogyo K.K., and having a 4.569 percent platinum content by weight) and a rhodium nitrate solution (made by Tanaka Kikinzoku Kogyo K.K., and having a 4.478 percent rhodium content by weight) were diluted with deionized water, the diluted solutions were impregnated into the honeycomb carrier which had been coated with the heat-resistant oxide G and the cerium-containing oxide X, to support the platinum and rhodium on the honeycomb carrier, whereby the exhaust gas purifying catalyst 7 was produced.

The contents of the components (heat-resistant oxide, noble metals, and cerium-containing oxide) per one liter of the honeycomb carrier capacity are shown in Table 1 (expressed in g/lcat).

7-3. Evaluation of the exhaust gas purifying catalyst 7:

An endurance test of the produced exhaust gas purifying catalyst 7 was performed at 950° C. for 60 hours by use of the engine bench, in the same manner as Example 1. Measurements were made on the catalytic activity under low temperature and the purifying rate at a CO-NOx crossover point. The results are shown in Table 1.

Example 8

8-1. Production of Heat-resistant Oxide H

Except that 5.8 g (0.020 moles) of barium methoxyethylate, 16.4 g (0.080 moles) of manganese methoxyethylate, and 40.4 g (0.160 moles) of aluminum methoxyethylate were employed, the same operations as those in Example 2 were performed, so that a blackish brown, powdery, heat-resistant oxide H of a single phase of magnetoplumbite having a composition of $BaMn_4Al_8O_{19}$ was produced.

The powder of the produced heat resistant oxide H was 21 m²/g in specific surface area.

8-2. Production of the exhaust gas purifying catalyst 8:

A cordierite carrier in the form of a honeycomb was coated with the powder of the produced heat-resistant oxide H, and then the platinum and rhodium were supported on the honeycomb carrier which had been coated with the heat-resistant oxide H and the cerium-containing oxide X, in the same operations as in the Example 7, whereby the exhaust gas purifying catalyst 8 was produced.

8-3. Evaluation of the exhaust gas purifying catalyst 8:

An endurance test of the produced exhaust gas purifying catalyst 8 was performed at 950° C. for 60 hours by use of the engine bench, in the same manner as Example 1. Measurements were made on the catalytic activity under low temperature and the purifying rate at a CO-NOx crossover point. The results are shown in Table. 1.

Example 9

9-1. Production of Heat-resistant Oxide I

Except that 4.4 g (0.020 moles) of calcium methoxypropylate, 4.7 g (0.020 moles) of manganese methoxypropylate, and 64.7 g (0.220 moles) of aluminum methoxypropylate were employed, the same operations as those in Example 2 were performed, so that a blackish brown, powdery, heat-resistant oxide I having a composition of $CaMnAl_{11}O_{19}$ was produced. The powder of the produced heat resistant oxide I was amorphous and was 62.4 $m^2/g$ in specific surface area. When the powder was heat-treated at 1300° C. for 1 hour, the powder turned into a single phase of magnetoplumbite 5.1 $m^2/g$ in specific surface area.

9-2. Production of the exhaust gas purifying catalyst 9:

A cordierite carrier in the form of a honeycomb was coated with the powder of the produced heat-resistant oxide I, and then the platinum and rhodium were supported on the honeycomb carrier which had been coated with the heat-resistant oxide I and the cerium containing oxide X, in the same operations as in the Example 7, whereby the exhaust gas purifying catalyst 9 was produced.

9-3. Evaluation of the exhaust gas purifying catalyst 9

An endurance test of the produced exhaust gas purifying catalyst 9 was performed at 950° C. for 60 hours by use of the engine bench, in the same manner as Example 1. Measurements were made on the catalytic activity under low temperature and the purifying rate at a CO-NOx crossover point. The results are shown in Table 1.

Example 10

10-1. Production of Heat-resistant Oxide J:

Except that 4.1 g (0.020 moles) of magnesium methoxypropylate, 4.7 g (0.020 moles) of manganese methoxypropylate, and 64.7 g (0.220 moles) of aluminum methoxypropylate were employed, the same operations as those in Example 2 were performed, so that a blackish brown, powdery, heat-resistant oxide J having a composition of $MgMnAl_{11}O_{19}$ was produced. It was found that the powder of the produced heat resistant oxide J had a spinel phase and was 118 $m^2/g$ in specific area, and that when the powder was heat-treated at 1,300° C. for 1 hour, the powder had a $\alpha\text{-}Al_2O_3$ phase as well as a spinel phase and had a specific surface area of 2.9 $m^2/g$.

10-2. Production of the exhaust gas purifying catalyst 10:

A cordierite carrier in the form of a honeycomb was coated with the powder of the produced heat-resistant oxide J, and then the platinum and rhodium were supported on the honeycomb carrier which had been coated with the heat-resistant oxide J and the cerium-containing oxide X, in the same operations as in the Example 7, whereby the exhaust gas purifying catalyst 10 was produced.

10-3. Evaluation of the exhaust gas purifying catalyst 10:

An endurance test of the produced exhaust gas purifying catalyst 10 was performed at 950° C. for 60 hours by use of the engine bench, in the same manner as Example 1. Measurements were made on the catalytic activity under low temperature and the purifying rate at a CO-NOx crossover point. The results are shown in Table 1.

Example 11

11-1. Production of Heat-resistant Oxide K:

Except that 2.3 g (0.008 moles) of barium ethoxyethylate, 2.1 g (0.008 moles) of strontium ethoxyethylate, 1.4 g (0.004 moles) of yttrium ethoxyethylate, 4.7 g (0.020 moles) of manganese ethoxyethylate, and 64.7 g (0.220 moles) of aluminum ethoxyethylate were employed, the same operations as those in Example 2 were performed, so that a blackish brown, powdery, heat-resistant oxide K having a composition of $Ba_{0.4}Sr_{0.4}Y_{0.2}MnAl_{11}O_{19}$ was produced. The powder of the produced heat resistant oxide K was amorphous and was 116 $cm^2/g$ in specific surface area. When the powder was heat-treated at 1300° C. for 1 hour, the powder turned into a single phase of magnetoplumbite of 7.4 $m^2/g$ in specific surface area.

11-2. Production of the exhaust gas purifying catalyst 11:

A cordierite carrier in the form of a honeycomb was coated with the powder of the produced heat-resistant oxide K, and then the platinum and rhodium were supported on the honeycomb carrier which had been coated with the heat-resistant oxide K and the cerium-containing oxide X, in the same operations as in the Example 7, whereby the exhaust gas purifying catalyst 11 was produced.

11-3. Evaluation of the exhaust gas purifying catalyst 11:

An endurance test of the produced exhaust gas purifying catalyst 11 was performed at 950° C. for 60 hours by use of the engine bench, in the same manner as Example 1. Measurements were made on the catalytic activity under low temperature and the purifying rate at a CO-NOx crossover point. The results are shown in Table 1.

Comparative Example 1

1-1. Production of the exhaust gas purifying catalyst 12:

After 50 g of the powder of the cerium-containing oxide X and deionized water were added to 100 g of the powder of γ-alumina (SPHERALITE 531P, 102 $m^2/g$ in specific surface area, made by PROCATALYSE, French corporation) under stirring to form a slurry, 70 g of alumina sol (alumina sol-200, made by Nissan Kagaku Kogyo K.K., 7.5 g in solid, which were employed also in the following comparative example) per 150 g of the mixed powder was further added to the slurry and fully stirred. Then, a cordierite carrier (30 mm in diameter, 50 mm in length) in the form of a honeycomb (400/$inch^2$ in the number of cells) was coated with the resulting slurry. And, this coated cordierite carrier, after being dried, was fired in an electric furnace at 600° C. for 3 hours under atmospheric pressure.

Then, after a dinitrodiammine platinum nitrate solution (made by Tanaka Kikinzoku Kogyo K.K., and having a 4.569 percent platinum content by weight) and a rhodium nitrate solution (made by Tanaka Kikinzoku Kogyo K.K., and having a 4.478 percent rhodium content by weight) were diluted with deionized water, the diluted solutions were impregnated into the honeycomb carrier which had been coated with the γ-alumina and the cerium-containing oxide, so as to support the platinum and rhodium on the honeycomb carrier, whereby the exhaust gas purifying catalyst 12 was produced.

The contents of the components (γ-alumina, noble metals) per one liter of honeycomb carrier capacity are shown in Table 1 (expressed in g/lcat).

1-2. Evaluation of the exhaust gas purifying catalyst 12:

An endurance test of the produced exhaust gas purifying catalyst 12 was performed at 950° C. for 60 hours by use of the engine bench, in the same manner as Example 1. Measurements were made on the catalytic activity under low temperature and the purifying rate at a CO-NOx crossover point. The results are shown in Table. 1.

Comparative Example 2

2-1. Production of the exhaust gas purifying catalyst 13:

After 50 g of the powder of the cerium-containing oxide X and deionized water were added to 100 g of the powder of γ-alumina (SPHERALITE 531P, 102 m²/g in specific surface area, made by PROCATALYSE, French corporation) under stirring, to form a slurry, 70 g of alumina sol (alumina sol-200, made by Nissan Kagaku Kogyo K.K., 7.5 g in solid) per 150 g of the mixed powder was further added to the slurry and fully stirred. Then, a cordierite carrier (30 mm in diameter, 50 mm in length) in the form of a honeycomb (400/inch² in the number of cells) was coated with the resulting slurry. And, this coated cordierite carrier, after being dried, was fired in an electric furnace at 600° C. for 3 hours under atmospheric pressure.

Then, after a palladium nitrate solution (made by Tanaka Kikinzoku Kogyo K.K., and having a 4.400 percent palladium content by weight) was diluted with deionized water, the diluted solutions were impregnated into the honeycomb carrier which had been coated with the γ-alumina and the cerium-containing oxide, so as to support the palladium on the honeycomb carrier, whereby the exhaust gas purifying catalyst 13 was produced.

The contents of the components (γ-alumina, noble metals) per one liter of honeycomb carrier capacity are shown in Table 1 (expressed in g/lcat).

2-2. Evaluation of the exhaust gas purifying catalyst 13:

An endurance test of the produced exhaust gas purifying catalyst 13 was performed at 950° C. for 60 hours by use of the engine bench, in the same manner as Example 1. Measurements were made on the catalytic activity under low temperature and the purifying rate at a CO-NOx crossover point. The results are shown in Table 1.

The table 1 shows that the exhaust gas purifying catalyst of the invention exhibits excellent catalytic activity under low temperature and the purifying rate at a CO-NOx crossover point, even after the endurance test of the catalyst was performed at 950° C. for 60 hours. This proves that the exhaust gas purifying catalyst of the invention is far superior to that employing γ-alumina as a carrier.

Thus, the exhaust gas purifying catalyst of the invention exhibits excellent catalytic purifying activity, without heat deterioration, in long term use under high temperatures exceeding 900° C. which is a required temperature for an exhaust gas purifying catalyst. This can provide a specific result that the catalytic purifying activity of the catalyst can be maintained over a long term use, even if the catalyst is placed near a motor which increases in temperature to an extremely high temperature.

TABLE 1

| | No. | Heat-Resistant Oxide (g/lcat) | | $Ce_{0.65}Zr_{0.30}Y_{0.05}$Oxide (g/lcat) | Noble Metal (g/lcat) | | | Activity under the Low Temperature $T_{50}$ °C. | | | Purifying Rate at CO—$NO_x$ Crossover Point |
|---|---|---|---|---|---|---|---|---|---|---|---|
| | | | | | Pt | Rh | Pd | CO | $NO_x$ | THC | |
| Example | 1 | $BaMnAl_{11}O_{19}$ | (150) | — | 0.5 | 0.15 | — | 243 | 230 | 248 | 89.7 |
| | 2 | $SrMnAl_{11}O_{19}$ | (150) | — | 0.5 | 0.15 | — | 224 | 218 | 229 | 99.3 |
| | 3 | $Sr_{0.2}La_{0.8}MnAl_{11}O_{19}$ | (150) | — | 0.5 | 0.15 | — | 247 | 243 | 254 | 88.5 |
| | 4 | $Ba_{0.8}K_{0.2}MnAl_{11}O_{19}$ | (100) | 50 | — | — | 2.0 | 241 | 226 | 247 | 87.9 |
| | 5 | $Sr_{0.8}La_{0.2}MnAl_{11}O_{19}$ | (100) | 50 | — | — | 2.0 | 217 | 212 | 225 | 97.6 |
| | 6 | $Mg_{0.8}Y_{0.2}MnAl_{11}O_{19}$ | (100) | 50 | — | — | 2.0 | 235 | 226 | 243 | 93.5 |
| | 7 | $BaMn_{0.5}Al_{11.5}O_{19}$ | (100) | 50 | 0.5 | 0.15 | — | 251 | 249 | 258 | 80.2 |
| | 8 | $BaMn_4Al_8O_{19}$ | (100) | 50 | 0.5 | 0.15 | — | 241 | 234 | 245 | 95.1 |
| | 9 | $CaMnAl_{11}O_{19}$ | (100) | 50 | 0.5 | 0.15 | — | 223 | 217 | 232 | 97.6 |
| | 10 | $MgMnAl_{11}O_{19}$ | (100) | 50 | 0.5 | 0.15 | — | 218 | 212 | 227 | 98.6 |
| | 11 | $Ba_{0.4}Sr_{0.4}Y_{0.2}MnAl_{11}O_{19}$ | (100) | 50 | 0.5 | 0.15 | — | 217 | 212 | 227 | 98.1 |
| Co. Ex. | 1 | γ-$Al_2O_3$ | (100) | 50 | 0.5 | 0.15 | — | 276 | 273 | 313 | 79.6 |
| | 2 | γ-$Al_2O_3$ | (100) | 50 | — | — | 2.0 | 302 | 305 | 311 | 74.6 |

What is claimed is:

1. An exhaust gas purifying catalyst comprising a noble metal and a heat-resistant oxide expressed by the following formula:

$AMn_xAl_{12-x}O_{19}$ where A represents an alkaline earth metal or a combination of (1) an alkaline earth metal and (2) an alkali metal and/or a rare earth element, and x represents an atomic ratio of 0.5 to 4.

2. The exhaust gas purifying catalyst according to claim 1, wherein said alkaline earth metal is at least one element selected from the group consisting of Mg, Ca, Sr, and Ba.

3. The exhaust gas purifying catalyst according to claim 1, wherein said alkali metal is K.

4. The exhaust gas purifying catalyst according to claim 1, wherein said rare earth element is at least one element selected from the group consisting of La and Y.

5. The exhaust gas purifying catalyst according to claim 1, wherein said noble metal is at least one element selected from group consisting of Pt, Rh and Pd.

6. The exhaust gas purifying catalyst according to claim 1, further comprising a cerium-containing oxide.

7. The exhaust gas purifying catalyst according to claim 6, wherein said cerium-containing oxide is a complex oxide of the formula $CeO_2$—$ZrO_2$—$Y_2O_3$.

8. The exhaust gas purifying catalyst according to claim 1, wherein up to 0.8 in terms of atomic ratio of an alkali metal and/or a rare earth metal is combined with the alkaline earth metal.

* * * * *